US012578912B2

(12) United States Patent
Zhuang et al.

(10) Patent No.: US 12,578,912 B2
(45) Date of Patent: Mar. 17, 2026

(54) CHIP AND RELATED ELECTRONIC DEVICE

(71) Applicant: MediaTek Singapore Pte. Ltd., Singapore (SG)

(72) Inventors: Yukun Zhuang, Shenzhen (CN); Senpu Guo, Shenzhen (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 391 days.

(21) Appl. No.: 18/347,299

(22) Filed: Jul. 5, 2023

(65) Prior Publication Data

US 2024/0184500 A1 Jun. 6, 2024

(51) Int. Cl.
G06F 3/14 (2006.01)
G09G 5/00 (2006.01)

(52) U.S. Cl.
CPC ........... G06F 3/1431 (2013.01); G09G 5/006 (2013.01)

(58) Field of Classification Search
USPC .......................................................... 345/519
See application file for complete search history.

(56) References Cited

U.S. PATENT DOCUMENTS

2007/0268415 A1* 11/2007 Ukyou ...................... H04S 7/30
381/17
2022/0319468 A1* 10/2022 Han .......................... G09G 5/14
2023/0410761 A1* 12/2023 Zong .................... H04N 13/398

FOREIGN PATENT DOCUMENTS

| CN | 207337881 U | 5/2018 |
| CN | 111083548 A | 4/2020 |
| CN | 215416441 U | 1/2022 |
| TW | 202022794 A | 6/2020 |

OTHER PUBLICATIONS

Chinese language office action dated Dec. 25, 2023, issued in application No. TW 112113088.

* cited by examiner

Primary Examiner — James A Thompson
Assistant Examiner — Kim Thanh T Tran
(74) Attorney, Agent, or Firm — McClure, Qualey & Rodack, LLP

(57) ABSTRACT

A chip includes at least one input interface, an output interface, and a data processing module. The at least one input interface receives at least one input source. The output interface includes a VB1 interface. The VB1 interface is divided into a first VB1 output terminal and a second VB1 output terminal. The data processing module is coupled to the at least one input interface and the output interface and configured to process input data of the at least one input source to obtain the same or different content. The first VB1 output terminal and the second VB1 output terminal output the same or different content, so as to achieve a function of a simultaneous display or a different display. The present application provides an electronic device. The present application can perform the function of the simultaneous display or the different display using the same chip.

14 Claims, 5 Drawing Sheets

100 x1 data lanes 121
122
} 120 x2 data lanes

100 y1 data lanes 121
122
} 120 y2 data lanes

900

1000

CHIP AND RELATED ELECTRONIC DEVICE

CROSS REFERENCE TO RELATED APPLICATIONS

This application claims priority of China Patent Application No. 202211547361.9, filed on Dec. 2, 2022, the entirety of which is incorporated by reference herein.

BACKGROUND OF THE INVENTION

Field of the Invention

The disclosed embodiments of the present application relate to the field of display technology, and more specifically, to a chip and an electronic device

Description of the Related Art

With the continuous development of display products and related applications, displays are utilized in various industries and are of great importance in broadcasting information in various industries. Dual-screen displays play a very important role in many industries. Dual-screen displays can flexibly display content in different types of presentations, such as conference presentations and speeches, which makes dual-screens displays strategically significant in the electronic information industry. Therefore, research on dual-screen displays has become more important.

BRIEF SUMMARY OF THE INVENTION

Thus, the present application provides a chip and an electronic equipment to solve the above problems.

In order to solve the above problems, the first aspect of the present application provides a chip. The chip comprises at least one input interface, an output interface, and a data processing module. The at least one input interface receives at least one input source. The output interface comprises a VB1 interface. The VB1 interface is divided into a first VB1 output terminal and a second VB1 output terminal. The data processing module is coupled to the at least one input interface and the output interface and configured to process input data from the at least one input source to obtain the same or different content. The first VB1 output terminal and the second VB1 output terminal output the said content, thereby performing a function of a simultaneous display or a different display.

In order to solve the above problems, the second aspect of the present application provides an electronic device comprising the chip described in the first aspect above, wherein the chip is connected to a first display screen and a second display screen.

In order to solve the above problems, the third aspect of the present application provides an electronic device comprising the chip described in the first aspect above, a first display screen, and a second display screen, wherein the first display screen is connected to the first VB1 output terminal, and the second display screen The screen is connected to the second VB1 output terminal.

The beneficial effects of the present application are: different from the prior art, the chip of the present application outputs at least one input source as the same or different content through a VB1 interface that is divided into a first VB1 output terminal and a second VB1 output terminal, thereby performing a function of a simultaneous display or a different display and further achieving the function of the simultaneous display or the different display by using the same chip.

A detailed description is given in the following embodiments with reference to the accompanying drawings.

BRIEF DESCRIPTION OF THE DRAWINGS

In order to more clearly illustrate the technical solutions in the embodiments of the present application, the accompanying drawings that need to be used in the description of the embodiments will be briefly introduced below. Obviously, the accompanying drawings in the following description are only some embodiments of the present application. For those of ordinary skill in the art, other drawings can also be obtained based on these drawings without creative work, wherein.

DETAILED DESCRIPTION OF THE INVENTION

Reference in the present application to an "embodiment" means that a particular feature, structure, or characteristic described in an embodiment can be included in at least one embodiment of the present application. The appearances of this phrase in various paragraphs or lines in the specification are not necessarily all referring to the same embodiment, nor are independent or alternative embodiments mutually exclusive of other embodiments. It is understood explicitly and implicitly by those of ordinary skill in the art that an embodiment described herein can be combined with other embodiments.

The term "and/or" in the present application is just an association relationship describing associated objects, which means that there may be three relationships. For example, A and/or B may mean three situations: A exists alone, A and B exist simultaneously, and B exists alone. In addition, the character "/" described in the present application generally indicates an "or" relationship between the associated object before the character "/" and the associated object after the character "/". In addition, "a plurality of" described in the present application means two or more than two. In addition, the term "at least one" described in the present application means any one of a plurality of elements or any combination of at least two of a plurality of elements. For example, comprising at least one of A, B, and C, may mean comprising one or more elements selected from the collection of A, B, and C. In addition, the terms "first", "second", and "third" in the present application are only used for description and should not be understood as indicating or implying relative importance or implicitly specifying the number of indicated technical features.

In order to enable those of ordinary skill in the art to better understand the technical solutions of the present application, the technical solutions of the present application will be further described in detail below in conjunction with the accompanying drawings and the specific embodiments.

Figure 1:
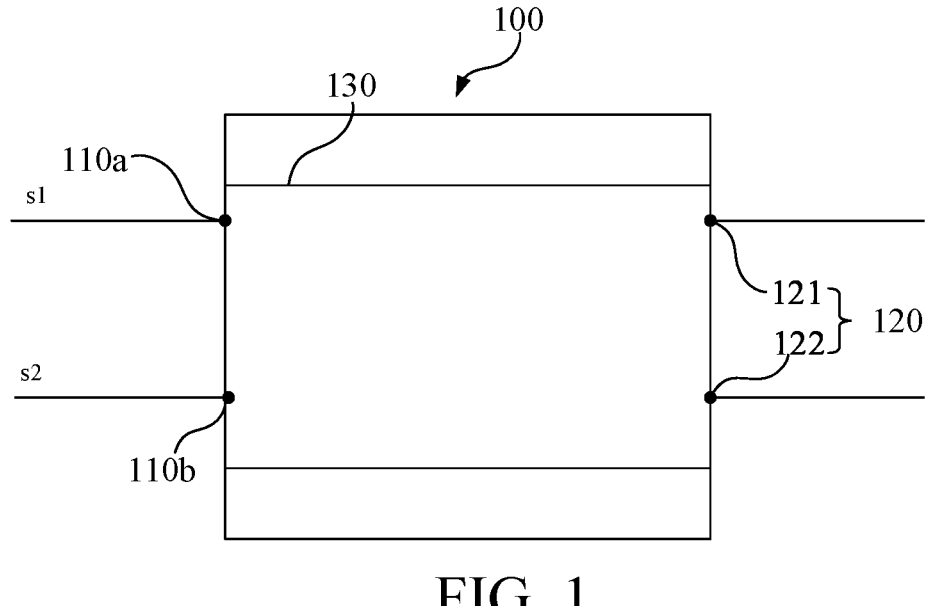
FIG. 1 is a structural schematic view of a chip of an embodiment of the present application.
Figure 2:
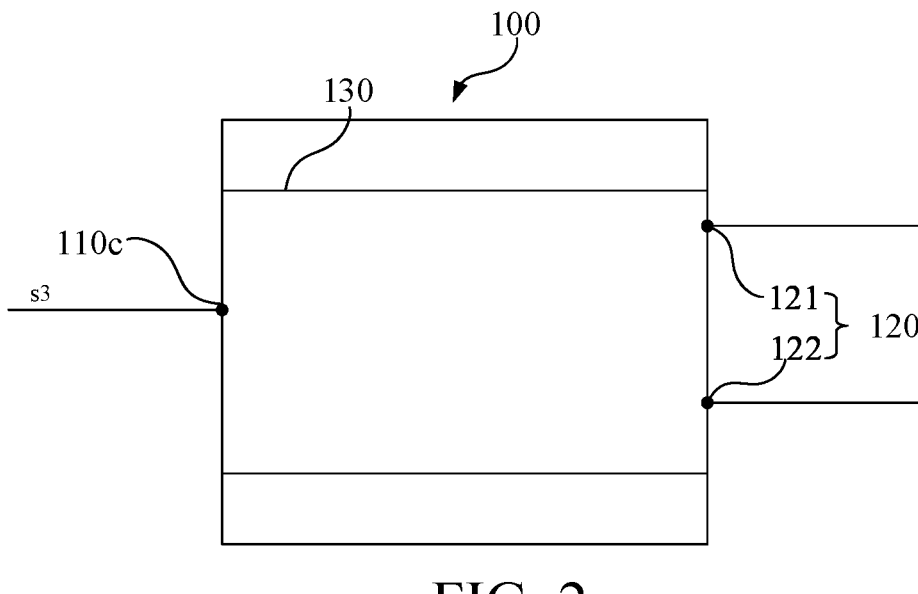
FIG. 2 is a structural schematic view of a chip of another embodiment of the present application.

Please refer to FIG. 1 and FIG. 2, FIG. 1 and FIG. 2 are structural schematic diagrams of chips of the embodiments of the present application. A chip 100 is implemented as an integral chip that comprises at least one input interface, an output interface, and a data processing module. The data processing module is coupled to the at least one input interface and the output interface. For example, as shown in FIG. 1, the chip 100 comprises input interfaces 110a and 110b, an output interface 120, and a data processing module 130, and the data processing module 130 is coupled to the two input interfaces 110a and 110b and the output interface 120. In another example, as shown in FIG. 2, the chip 100 comprises an input interface 110c, an output interface 120, and a data processing module 130, and the data processing module 130 is coupled to then input interface 110c and the output interface 120.

At least one input interface is used to receive at least one input source. The input source may be a multimedia signal source, such as a video source or an image source. In the embodiment shown in FIG. 1, each of the input interfaces 110a and 110b receives an input source. In the embodiment shown in FIG. 2, the input interface 110c receives an input source.

The output interface 120 comprises a VB1 (V-by-One) interface 120 that is divided into a first VB1 output terminal 121 and a second VB1 output terminal 122.

The data processing module 130 processes the at least one input source. In FIG. 1, the data processing module 130 processes a first input source s1 and a second input source s2 to obtain the same content or different content. In FIG. 2, the data processing module 130 processes a first input source s3 to obtain the same content or different content. The chip 100 can perform the simultaneous display or different display by using a single chip without switching between a plurality of chips, thereby reducing the complexity and cost of the produces.

It should be noted that, in some embodiments, the data processing module 130 is implemented by a video processor or an image processor.

Wherein, a first VB1 output terminal 121 and a second VB1 output terminal 122 are used to output the same or different content (wherein the same or different content means that the content may be the same or it may be different) based on at least one input source, so as to perform the function of the simultaneous display or the different display. For example, in FIG. 1, the input source received by the input interface 110a and the input source received by the input interface 110b are output as the same or different content through the data processing module 130. In another example, in FIG. 2, the input source received by the input interface 110c is output as the same or different content through the data processing module 130. It should be noted that the specific architecture of the VB1 (V-by-One) interface in the present application is only briefly described, and all kinds of VB1 interfaces are within the scope of the present application.

A first VB1 output terminal 121 and a second VB1 output terminal 122 of the VB1 interface 120 are used to output at least one input source as the same content, thereby performing the function of the simultaneous display.

The first VB1 output terminal 121 and the second VB1 output terminal 122 of the VB1 interface 120 are used to output at least one input source as different content, so as to achieve the function of the different display.

In the embodiment, the output interface 120 is divided into the first VB1 output terminal 121 and the second VB1 output terminal 122, and at least one input source is output as the same or different content, so as to achieve the function of the simultaneous display or the different display and further achieve the function of the simultaneous display or the different display by using the same chip.

As mentioned above, at least one input interface is used to receive at least one input source. In some exemplary embodiments, as shown in FIG. 1, at least one input interface comprises a first input interface 110a and a second input interface 110b, and at least one input source comprises a first input source s1 and a second input source s2.

The first input interface 110a is used to receive the first input source s1, and the second input interface 110b is used to receive the second input source s2. The first input source s1 and the second input source s2 may be the same. For example, the first input source s1 and the second input source s2 are the same video source, that is, the first input source s1 and the second input source s2 are the same.

The first input interface 110a is used to receive the first input source s1, and the second input interface 110b is used to receive the second input source s2. The first input source s1 and the second input source s2 may be different. For example, the first input source s1 is a video source, while the second input source s2 is an image source, that is, the first input source s1 and the second input source s2 are different.

Wherein, the video source can be a video in any one of various video formats, such as MP4, AVI, etc. The image source can be any one of various images, such as a still image, a moving image, etc.

In other exemplary embodiments, as shown in FIG. 2, the first input interface 110c is divided into a first input terminal and a second input terminal, and the first input source s3 is processed into a first input portion and a second input portion, wherein the first input terminal is used to receive the first input portion, the second input terminal is used to receive the second input portion. The first input portion is different from the second input portion.

In the embodiment shown in FIG. 2, the first input interface 110c is divided into a first input terminal and a second input terminal. Similarly, in the embodiment shown in FIG. 2, the first input source s3 is processed into two different inputs that are a first input portion and a second input portion. For example, the first input source s3 is a video source and processed into two input portions, such as a video source and a plurality of images extracted from the video source.

As described above, the VB1 interface 120 is divided into the first VB1 output terminal 121 and the second VB1 output terminal 122. In some embodiments, the VB1 interface 120 comprises lanes of a present number. The preset number may be 12, 16, etc. In cases where the preset number is 12 or 16, the VB1 interface 120 is referred to as a 12-lane or 16-lane VB1. The number of lanes may be determined according to actual requirements, which is not limited here.

Figures 3, 4:
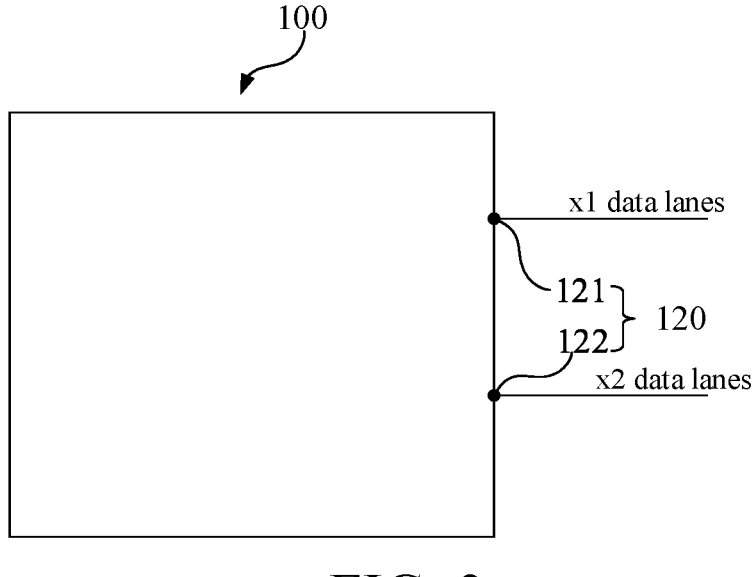
FIG. 3 is a partial structural schematic view of a chip of another embodiment of the present application.
FIG. 4 is a partial structural schematic view of a chip of another embodiment of the present application.

FIG. 3 is a partial structural view of a chip of an embodiment of the present application. In response to the VB1 interface 120 being divided into the first VB1 output terminal 121 and the second VB1 output terminal 122, the first VB1 output terminal 121 occupies a first number x1 of data lanes, and the second VB1 output terminal 122 occupies a second number x2 of data lanes, wherein the first number x1 is equal to the second number x2. The sum of the first number x1 and the second number x2 is equal to the preset number.

That is, the preset number of the data lanes are divided into two portions, i.e. the first number of x1 of the data lanes and the second number x2 of the data lanes. The number of data lanes occupied by the first VB1 output terminal 121 is equal to the number of data lanes occupied by the second VB1 output terminal 122, that is, the first number x1 is equal to the second number x2.

For example, when the preset number is 16, the first number x1 can be 8, and the second number can be 8. Then, the first number x1 is equal to the second number x2, and the sum of the first number x1 and the second number x2 is equal to the preset number of 16.

FIG. 4 is a partial structural schematic view a chip of another embodiment of the present application. In response to the VB1 interface 120 being divided into the first VB1 output terminal 121 and the second VB1 output terminal 122, the first VB1 output terminal 121 occupies a first number y1 of the data lanes of, and the second VB1 output terminal 122 occupies a second number y2 of the data lanes of, wherein the first number y1 is less than the second number y2. The sum of the first number y1 and the second number y2 is less than or equal to the preset number.

That is, the preset number of the data lanes are divided into two portions, i.e. the first number y1 of the data lanes of and the second number y2 of the data lanes of. The number of data lanes occupied by the first VB1 output terminal 121 is less than the number of data lanes occupied by the second VB1 output terminal 122, that is, the first number y1 is less than the second number y2. The sum of the first number y1 and the second number y2 is less than or equal to the preset number.

For example, in an exemplary embodiment where the preset number is 16, the first number y1 can be 4, and the second number y2 can be 8. Then, the first number y1 is less than the second number y2, and the sum of the first number y1 and the second number y2 is less than 16.

In an exemplary embodiment where the preset number is 12, the first number y1 can be 4, and the second number y2 can be 8. Then, the first number y1 is less than the second number y2, and the sum of the first number y1 and the second number is equal to 12.

Figure 5:
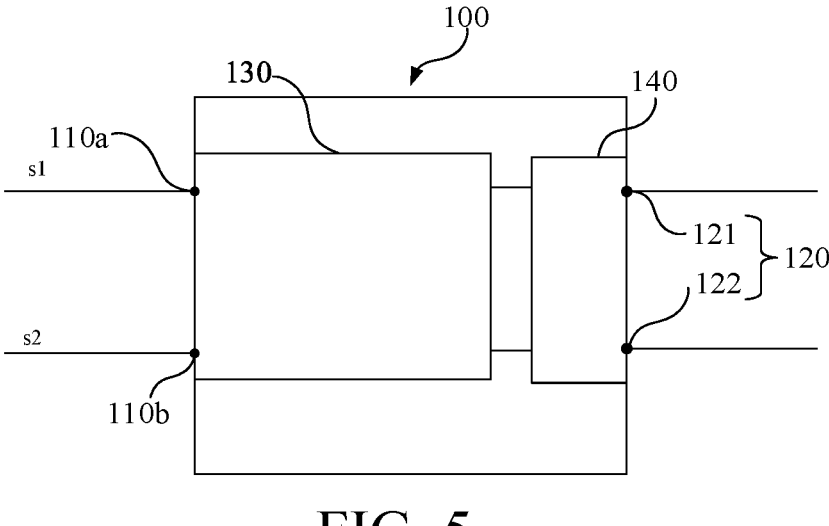
FIG. 5 is a schematic structural view of a chip of another embodiment of the present application.

As described above, the chip 100 comprises the output interface 120, the first input interface 110*a*, the second input interface 110*a*, and data processing module 130. In some embodiments, as shown in the FIG. 5, FIG. 5 is a schematic structural view of a chip of another embodiment of the present application. On the basis provided by the above embodiments, the chip 100 further comprises a lane processing module 140.

The lane processing module 140 is connected to the data processing module 130 and used to output the same or different content through the lanes so that the same or different content is output through the first VB1 output terminal 121 and the second VB1 output terminal 122 respectively. For example, the lane processing module 140 is a multiplexer for selecting the content output by the first VB1 output terminal 121 and the second VB1 output terminal 122.

The lane processing module 140 outputs the same or different content processed by the data processing module

130 through the lanes. There are two cases of outputting the content. In one case, the same content is output through both of the first VB1 output terminal 121 and the second VB1 output terminal 122, that is, the content output by the first VB1 output terminal 121 is the same as the content of the second VB1 output terminal 122, which is referred to as a simultaneous display. In the other case, different content is output through the first VB1 output terminal 121 and the second VB1 output terminal 122 respectively, that is, the content output by the first VB1 output terminal 121 is different from the content output by the second VB1 output terminal 122, which is referred to as a different display.

As described above, the data processing module 130 is connected to at least one input interface for processing at least one input source. In some exemplary embodiments, referring to FIG. 6, a schematic structural view of a chip of another embodiment of the present application is shown.

The data processing module 130 comprises a first processing sub-module 131 and a second processing sub-module 132. The first processing sub-module 131 is connected to the first input interface 110*a* and the lane processing module 140 for processing the first input source s1 to obtain first content P1. The second processing sub-module 132 is connected to the second input interface 110*b* for processing the second input source s2 to obtain second content P2.

In response to the first VB1 output terminal 121 and the second VB1 output terminal 122 being used to output the first input source and the second input source as different content, the first content P1 is output through the first VB1 output terminal 121 or the combination of the first content P1 and the third content P3 is output through the first VB1 output terminal 121, and the second content P2 is output through the second VB1 output terminal 122. The first content P1 is different from the second content P2. The first processing sub-module 131 is connected to the first input interface 110*a* and the lane processing module 140, which indicates that the first processing sub-module 131 is connected between the first input interface 110*a* and the lane processing module 140. The first processing sub-module 131 processes the first input source s1 to obtain the first content P1. The second processing sub-module 132 is connected to the second input interface 110*b* and the lane processing module 140, which indicates that the second processing sub-module 132 is connected between the second input interface 110*b* and the lane processing module 140. The second processing sub-module 132 processes the second input source s2 to obtain the second content P2. The second content P2 is transmitted to the lane processing module 140 and then output through the second VB1 output terminal 122.

Figure 6:
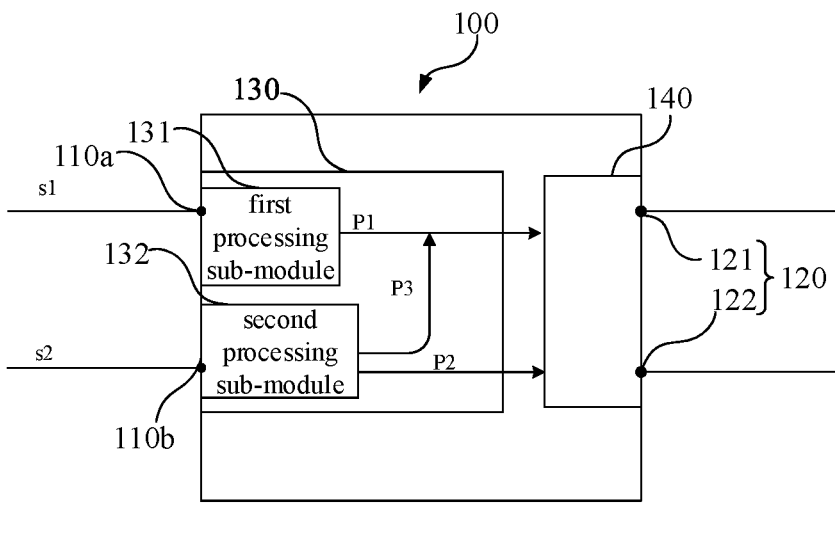
FIG. 6 is a schematic structural view of a chip of another embodiment of the present application.

Furthermore, as shown in FIG. 6, in some exemplary embodiments, the second processing sub-module 132 is further used to process the second input source s2 to obtain the third content P3. The third content P3 may be data included in the second input source s2.

At this time, the first content P1 and the third content P3 are combined. The combination of the first content P1 and the third content P3 is output through the first VB1 output terminal 121, and the second content P2 is output through the second VB1 output terminal 132 so that the first VB1 output terminal 131 and the second VB1 output Terminal 132 outputs different content.

The second processing sub-module 132 processes the second input source s2 to obtain the third content P3. Wherein, the third content P3 may be combined with the first content P1, and then the combination of the first content P1 and the third content P3 is transmitted to the lane processing module 140 and output through the first VB1 output terminal 121.

In some exemplary embodiments, the first input source s1 is a video source, and the second input source s2 is an image source. Based on these embodiments, the above-mentioned third content P3 may be an image included in the image source, for example, OSD, subtitles, and the like.

Figure 7:
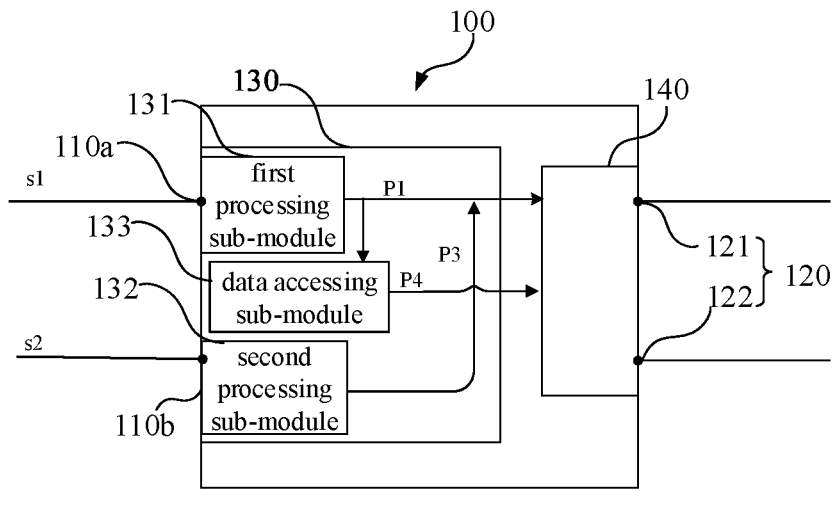
FIG. 7 is a schematic structural view of a chip of another embodiment of the present application.

A schematic structural view of a chip of another embodiment of the present application is shown in FIG. 7.

The data processing module 130 comprises a first processing sub-module 131, a second processing sub-module 132, and a data accessing sub-module 133. The first processing sub-module 131 is connected to the first input interface 110*a* and the lane processing module 140 for processing the first input source s1 to obtain first content P1. The data accessing sub-module 133 is connected to the first processing sub-module 131 and the lane processing module 140 for accessing the data obtained from the first input source s1 to obtain fourth content P4. For example, the fourth content P4 may be a sequence of images accessed from the first video input source s1.

The fourth content P4 may be a data set obtained by accessing the first input source s1. For example, the fourth content P4 may be a sequence of images or OSD data of the first input video source s1. The fourth content P4 may be transmitted to the lane processing module 140.

The first content P1 is output through the first VB1 output terminal 121. The fourth content P4 is output through the second VB1 output terminal 122. The first content P1 is the same as the fourth content P4.

The first content P1 is the content of the first input source s1. After the first content P1 is processed by the data accessing sub-module 133, the fourth content P4 is a data set by accessing the processed first input source s1. The first content P1 is output through the first VB1 output terminal 121. The four content P4 is output through the second VB1 output terminal 122. The first content P1 and the fourth content P4 output on the display screen are the same for the user.

In some exemplary embodiments, the first input source s1 is a video source, and the second input source s2 is an image source. Based on these embodiments, the above-mentioned first content P1 may be a video included in the video source.

For example, the first input source s1 is a video source that can be a video of scenery. The first input source s1 is processed by the first processing sub-module 131 to obtain the first content P1, and the first content P1 is a video of scenery. Then, the first content P1 is processed by the data accessing sub-module to obtain the fourth content P4. The fourth content P4 comprises at least one frame of scenery images, and the output scene of the first content P1 is the same as the output scene of the fourth content P4.

Furthermore, as shown in FIG. 7, in some exemplary embodiments, the second processing sub-module 132 is connected to the second input interface 110*b* for processing the second input source s2 to obtain third content P3.

At this time, the first content P1 and the third content P3 are combined, and the combination of the first content P1 and the third content P3 is output through the first VB1 output terminal 121. The fourth content P4 is output through the second VB1 output terminal 122. Thus, the first VB1 output terminal 121 and the second VB1 output terminal 122 output the same content.

In some exemplary embodiments, the first input source s1 is a video source, and the second input source s2 is an image source. Based on these embodiments, the above-mentioned third content P3 may be an image included in the image source, for example, OSD, subtitles, and the like.

For example, the image source s2 can be a set of scenery images. The image source s2 is processed by the second processing sub-module 132 to obtain the third content P3. The third content P3 comprises at least one frame of scenery images. The fourth content P4 and the first content P1 may be the same content. The scene output through the first VB1 output terminal 121 after the first content P1 is combined with the third content P3 is the same as the scene output through the second VB1 based on the fourth content P4.

Wherein, after the third content P3 is combined with the first content P1, the combination of the third content P3 and the first content P1 is transmitted to the lane processing module 140 and output through the first VB1 output terminal 121.

Figure 8:
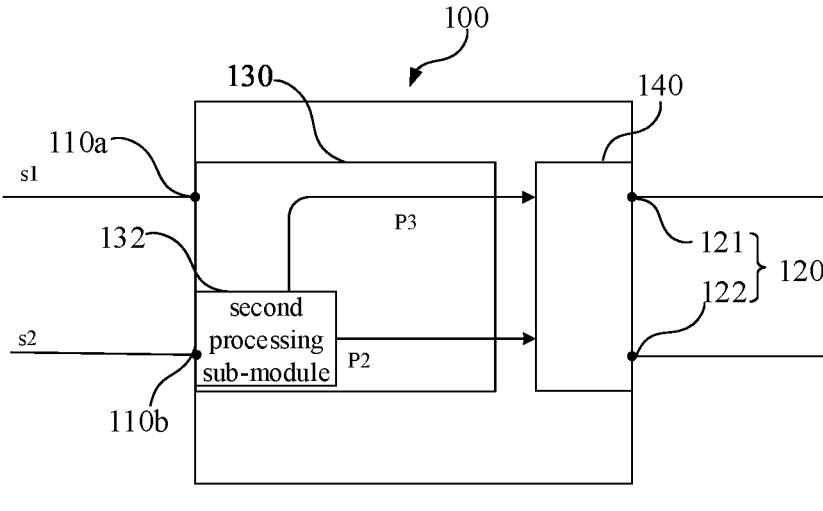
FIG. 8 is a schematic structural view of a chip of another embodiment of the present application.

A schematic structural view of a chip of another embodiment of the present application is shown in FIG. 8.

The data processing module 130 comprises a second processing sub-module 132 that is connected to the second input interface 110*b*. The second input interface 110*b* processes the second input source s2 to obtain second content P2 and third content P3. The second content P2 and the third content P3 are transmitted to the lane processing module 140.

In response to the first VB1 output terminal 121 and the second VB1 output terminal 133 being used to output the first input source s1 and the second input source s2 into the same content, the second content P2 is output through the second VB1 output terminal 122, and the third content P3 is output through the second VB1 output terminal 122. The second content P2 is the same as the third content P3.

In some exemplary embodiments, the first input source s1 is a video source, and the second input source s2 is an image source, which is taken as an example for illustration in the following. The second processing sub-module 132 processes the image source to obtain the second content P2 and the third content P3. The second content P2 is the same as the third content P3, that is, the third content P3 output by the first VB1 output terminal 121 is the same as the second content P2 output by the second VB1 output terminal 122. For example, the second input source s2 is an image source that may be a set of scenery images. After the second input source s2 is processed by the second processing sub-module 132, the obtained second content P2 and the obtained third content P3 are the same set of scenery images.

Figure 9:
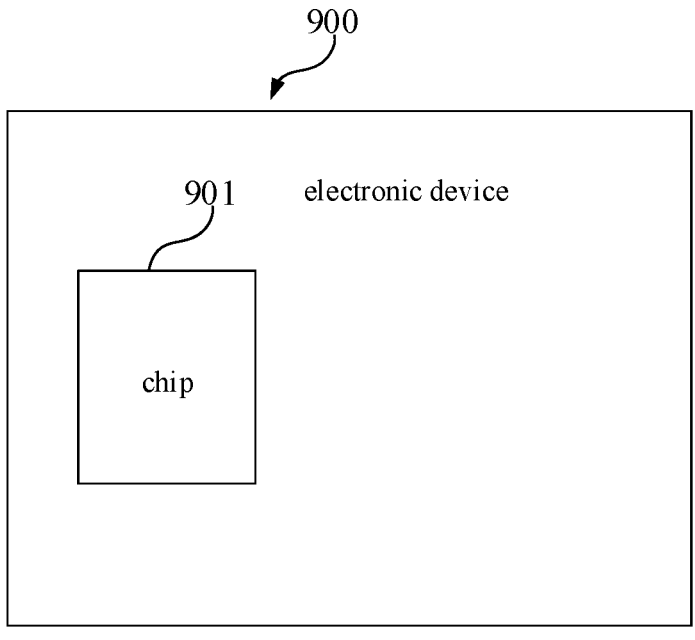
FIG. 9 is a schematic structural view of an electronic device of an embodiment of the present application.

Please read FIG. 9, FIG. 9 is a schematic structural view of an electronic device of an embodiment of the present application. An electronic device 900 comprises a chip 901, and the chip 901 is connected to a first display screen and a second display screen.

The chip 901 can be implemented by the chip 100 of the above-mentioned embodiments. The chip 901 is used to process at least one input source to output the same or different content that is then displayed on the first display screen and the second display screen connected to the chip 901.

Figure 10:
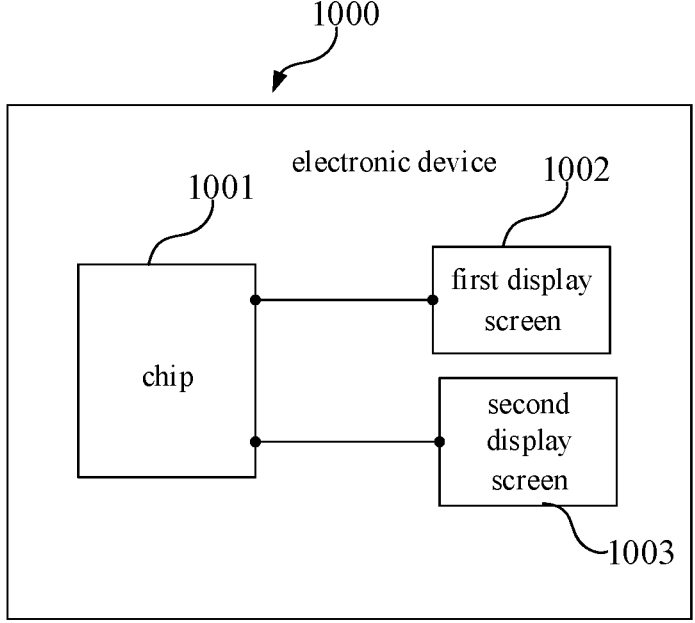
FIG. 10 is a schematic structural view of an electronic device of another embodiment of the present application.

Please read FIG. 10, FIG. 10 is a schematic structural view of an electronic device of another embodiment of the present application. An electronic device 1000 comprises a chip 1001, a first display screen 1002, and a second display screen 1003. The chip 1001 may be implemented by any one chip of the above-mentioned embodiments. The chip 1001 is connected to the first display screen 1002 and the second display screen 1003. For details of the chip 1001, please refer to the description of the above-mentioned embodiments, and the related description is omitted here for brevity.

The first display screen 1002 is connected to the first VB1 output terminal 121, and the second display screen 1003 is connected to the second VB1 output terminal 122. That is, the content output by the chip 1001 is output to the first display screen 1002 through the first VB1 output terminal 121 through the first VB1 output terminal 121 and output to the second display screen 1002 through the second VB1 output terminal 122.

As described above, the electronic device 1000 comprises the chip 1001, a first display screen 1002, and a second display screen 1003. In an exemplary embodiment, the first display screen 1002 is a display screen with a first resolution, and the second display screen 903 comprises a display screen with a second resolution.

The first resolution is higher than or equal to the second resolution. That is, there are two cases: first, the first resolution of the first display screen 1002 is higher than the second resolution of the second display screen 1003; second, the first resolution of the first display screen 1002 is equal to the second resolution of the second display screen 1003.

The first resolution of the first display screen 1002 is higher than the second resolution of the second display screen 1003. For example, the first resolution of the first display screen 1002 is 4K, and the second resolution of the second display screen 1003 is 2K. For example, the first display screen 1002 may be implemented by a 4K display screen, and the second display screen 1003 may be implemented by a 2K LVDS display screen.

The first resolution of the first display screen 1002 is equal to the second resolution of the second display screen 1003. For example, the first resolution of the first display screen 1002 is 4K, and the second resolution of the second display screen 1003 is also 4K. For example, the first display screen 1002 may be implemented by a 4K display screen, and the second display screen 1003 may be implemented by a 4K display screen or an HDMI display screen.

In some exemplary embodiments, the second display screen 1003 comprises an HDMI display screen 1003, and the output content of the second VB1 output terminal 122 is used to drive the HDMI display screen 1003. That is, when the second VB1 output terminal 122 is connected to the HDMI display screen 1003, the output content can be used to drive the HDMI display screen 1003 to achieve a turned-on state of the HDMI display screen 1003, without an additional driving device used to drive the HDMI display screen 1003 to be the turned-on state. For example, the output content is provided for achieving the turned-on state of the HDMI display screen 1003 through the conversion chip. Wherein, the HDMI display screen supports display equipment with a high-definition multimedia interface, which can transmit a large amount of information and provide clear images.

Although the application has been described according to certain specific embodiments for instructional purposes, the application is not limited thereto. Accordingly, various modifications, adaptations, and combinations of features may be made to the described embodiments without departing from the scope of the invention as set forth in the claims.

What is claimed is:

1. A chip comprising:
at least one input interface receiving at least one input source;
an output interface comprising a V-by-One (VB1) interface, wherein the VB1 interface is divided into a first VB1 output terminal and a second VB1 output terminal; and a data processing module, comprising circuitry, coupled to the at least one input interface and the output interface and configured to process input data from the at least one input source to obtain the same or different content,
wherein the first VB1 output terminal and the second VB1 output terminal output the same or different content, thereby performing a function of a co-display or a different display;
wherein the VB1 interface comprises a preset number of data lanes, in response to the VB1 interface being divided into the first VB1 output and the second VB1 output, the first VB1 output occupies a first number of data lanes, and a second number of the second VB1 output occupies data lanes, the first number is equal to or less than the second number, and the sum of the first number and the second number is equal to the preset number.

2. The chip as claimed in claim 1, wherein:
the at least one input interface comprises a first input interface and a second input interface,
the at least one input source comprises a first input source and a second input source, and
the first input interface receives the first input source, the second input interface receives the second input source, and the first input source is the same as or different from the second input source.

3. The chip as claimed in claim 2 further comprising:
a lane processing module connected to the data processing module and configured to output the same or different content through lanes so that the same or different content are output through the first VB1 output terminal and the second VB1 output terminal.

4. The chip as claimed in claim 3, wherein:
the data processing module comprises:
a first processing sub-module connected to the first input interface and the lane processing module and configured to process the first input source to obtain first content; and
a second processing sub-module connected to the second input interface and configured to process the second input source to obtain second content,
in response to the first VB1 output terminal and said second VB1 output terminal outputting the first input source and the second input source as the different content, the first content is output through the first VB1 output terminal, the second content is output through the second VB1 output terminal, and the first content is different from the second content.

5. The chip as claimed in claim 4, wherein:
the second processing sub-module is further configured to process the second input source to obtain third content,
the first content and the third content are combined, and
a combination of the first content and the third content is output through the first VB1 output terminal, and the second content is output through the second VB1 output terminal so that the first VB1 output terminal and the second VB1 output terminal output the different content.

6. The chip as claimed in claim 4, wherein the first input source is a video source, and the second input source is an image source.

7. The chip as claimed in claim 3, wherein:
the data processing module comprises:
a first processing sub-module, connected to the first input interface and the lane processing module, configured to process the first input source to obtain first content; and a data accessing sub-module, connected to the first processing sub-module and the lane processing module, configured to access data obtained from the first input source to obtain fourth content, in response to the first VB1 output terminal and said second VB1 output terminal outputting the first input source and the second input source as the same content, the first content is output through the first VB1 output terminal, the fourth content is output through the second VB1 output terminal, and the first content is the same as the fourth content.

8. The chip as claimed in claim 7, wherein:

the data processing module further comprises:

a second processing sub-module connected to the second input interface and configured to process the second input source to obtain third content, the first content is combined with the third content, and a combination of the first content and the third content is output through the first VB1 output terminal, and the fourth content is output through the second VB1 output terminal so that the first VB1 output terminal and the second VB1 output terminal output the same content.

9. The chip as claimed in claim 3, wherein:

the data processing module includes:

a second processing sub-module connected to the second input interface and configured to process the second input source to obtain second content and third content;

in response to the first VB1 output terminal and the second VB1 output terminal outputting the first input source and the second input source as the same content, the second content is output through the second VB1 output terminal, the third content is output through the first VB1 output terminal, and the second content is the same as the third content.

10. The chip as claimed in claim 1, wherein:

the at least one input interface comprises a first input interface, and the first input interface is divided into a first input terminal and a second input terminal, the at least one input source comprises a first input source, and the first input source is processed as a first input portion and a second input portion, and the first input terminal receives the first input portion, the second input terminal receives the second input portion, and the first input portion is different from the second input portion.

11. An electronic device comprising the chip as claimed in claim 1, wherein the chip is connected to a first display screen and a second display screen.

12. An electronic device as claimed in claim 11, wherein the first display screen is connected to the first VB1 output terminal, and the second display screen is connected to the second VB1 output terminal.

13. The electronic device as claimed in claim 11, wherein:

the first display screen is a display screen with a first resolution, and the second display screen comprises a display screen with a second resolution, and the first resolution is higher than or equal to the second resolution.

14. The electronic device as claimed in claim 11, wherein the second display screen comprises an HDMI display screen or a VB1 display screen, and the content output by the second VB1 output terminal is used for the HDMI display screen or VB1 display screen to drive the second display screen.

\* \* \* \* \*